(12) United States Patent
Larson et al.

(10) Patent No.: US 9,336,320 B2
(45) Date of Patent: May 10, 2016

(54) METHOD AND APPARATUS FOR NAVIGATING SERVICES

(75) Inventors: Melanie Larson, East Palo Alto, CA (US); Franklin Reynolds, Los Altos, CA (US); Keith R. Barraclough, Mountain View, CA (US); Stephen Hartford, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 1068 days.

(21) Appl. No.: 12/708,786

(22) Filed: Feb. 19, 2010

(65) Prior Publication Data

US 2011/0209073 A1 Aug. 25, 2011

(51) Int. Cl.
*G06F 3/14* (2006.01)
*G06F 17/30* (2006.01)
*G06F 9/44* (2006.01)

(52) U.S. Cl.
CPC .............. *G06F 17/3089* (2013.01); *G06F 9/44* (2013.01)

(58) Field of Classification Search
USPC .......... 715/200–277, 700–867; 700/701–866; 709/201–229; 705/50–79; 345/30–111; 348/206–231.9; 707/200–206, 783; 725/46; 439/152; 713/2
See application file for complete search history.

(56) References Cited

U.S. PATENT DOCUMENTS

| | | | |
|---|---|---|---|
| 6,167,255 A | 12/2000 | Kennedy, III et al. | |
| 7,089,022 B1 | 8/2006 | Kaplan | |
| 2004/0078812 A1* | 4/2004 | Calvert | 725/46 |
| 2007/0077944 A1 | 4/2007 | Bellenger et al. | |
| 2007/0128899 A1* | 6/2007 | Mayer | 439/152 |
| 2008/0177994 A1* | 7/2008 | Mayer | 713/2 |
| 2009/0177385 A1 | 7/2009 | Matas et al. | |
| 2009/0178005 A1* | 7/2009 | Jheng | 715/825 |
| 2010/0131558 A1* | 5/2010 | Logan et al. | 707/783 |
| 2010/0159896 A1 | 6/2010 | Shin et al. | |

FOREIGN PATENT DOCUMENTS

WO   WO 2010/049918 A1   5/2010

* cited by examiner

*Primary Examiner* — Ruay Ho
(74) *Attorney, Agent, or Firm* — Ditthavong & Steiner, P.C.

(57) ABSTRACT

An approach is provided for providing user interface navigation information associated with the availability of services. Location information associated with a device is received. Menu items associated with one or more services based on the location information are selected. Presentation of the selected menu items in a bridge is caused, at least in part. The bridge is a user interface element common to the services.

18 Claims, 11 Drawing Sheets

METHOD AND APPARATUS FOR NAVIGATING SERVICES

BACKGROUND

Service providers and device manufacturers (e.g., wireless, cellular, etc.) are continually challenged to deliver value and convenience to consumers by, for example, providing compelling network services. Many of these services are provided to users via devices and/or via a communication network (e.g., the Internet). Web pages of online content, including services, have been navigated using navigation bars that include menu items. However, these navigation bars frequently do not reflect contextual information associated with the services and/or the user of the services. As such, many of these navigation bars are static and cannot react to contextual changes that may affect content. Further, it is technically difficult for websites that do personalize or customize content for users to streamline such navigation bars for use with multiple services and/or websites.

SOME EXAMPLE EMBODIMENTS

Therefore, there is a need for an approach for a bridge that provides available services based, at least in part, on location information.

According to one embodiment, a method comprises receiving location information associated with a device. The method also comprises selecting menu items associated with one or more services based on the location information. The method further comprises causing, at least in part, presentation of the selected menu items in a bridge. The bridge is a user interface element common to the services.

According to another embodiment, an apparatus comprising at least one processor, and at least one memory including computer program code, the at least one memory and the computer program code configured to, with the at least one processor, cause, at least in part, the apparatus to receive location information associated with a device. The apparatus is also caused to select menu items associated with one or more services based on the location information. The apparatus is further caused to causing, at least in part, presentation of the selected menu items in a bridge. The bridge is a user interface element common to the services.

According to another embodiment, a computer-readable storage medium carrying one or more sequences of one or more instructions which, when executed by one or more processors, cause, at least in part, an apparatus to receive location information associated with a device. The apparatus is also caused to select menu items associated with one or more services based on the location information. The apparatus is further caused to causing, at least in part, presentation of the selected menu items in a bridge. The bridge is a user interface element common to the services.

According to another embodiment, an apparatus comprises means for receiving location information associated with a device. The apparatus also comprises means for selecting menu items associated with one or more services based on the location information. The apparatus further comprises means for causing, at least in part, presentation of the selected menu items in a bridge. The bridge is a user interface element common to the services.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing the availability of services based on location information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
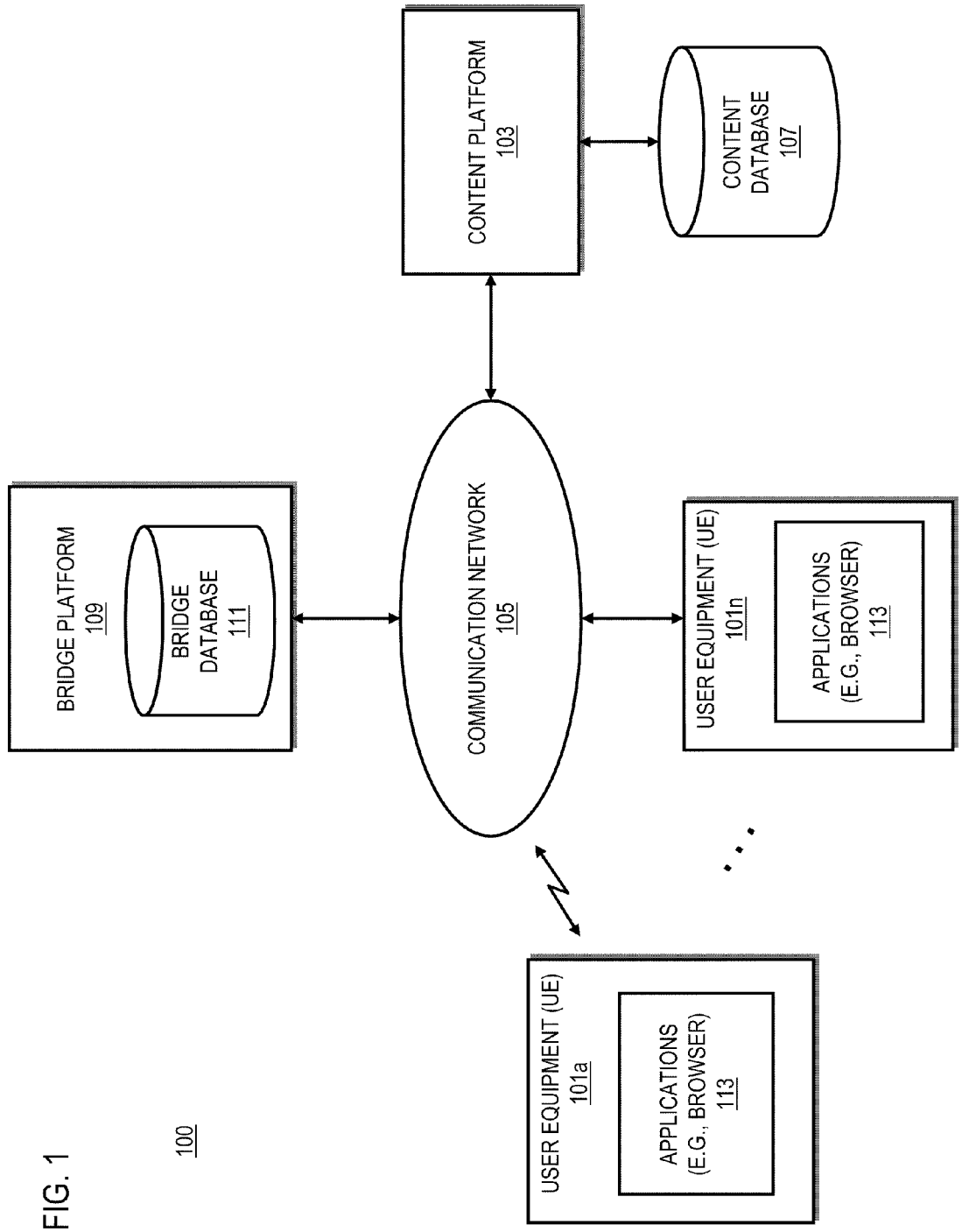
FIG. 1 is a diagram of a system capable of providing user interface navigation information associated with the availability of services, according to one embodiment.

FIG. 1 is a diagram of a system capable of providing user interface navigation information associated with the availability of services, according to one embodiment. Services and content are provided to users via devices using a variety of approaches. For example, some services may be provided via a web page using an internet connection while other services may be provided using an application associated with a device. Within any one of these services, users are typically presented with navigation bars and/or other means to view and navigate between services or content associated with the services. These navigation bars, however, have generally been specific to each service. Thus, service providers historically need to manually customize or localize navigation bars for each respective service (e.g., web site, application, etc.) to display or present a common navigation bar that reflects the available services based on the applied criteria (e.g., different locations). However, it is noted that the services available to any particular user generally may change or be altered based on various criteria (e.g., location, device capability, etc.). As such, service providers face significant technical challenges to providing access to a common collection of services using a consistent and customizable (e.g., based on location) navigation bar. Moreover, it is difficult and costly for providers of multiple services to continuously develop and deliver navigation elements that accurately reflect the location of a user.

To address this problem, a system 100 of FIG. 1 introduces the capability to provide navigation information associated with the availability of services via a bridge. As used herein, the term bridge refers to a user interface element that provides for the navigation of content, which may include services. Although various embodiments are described with respect to a bridge platform, it is contemplated that the approach described herein may be used with other platforms, such as content platforms, as well as browsers and applications associated with user equipment. In certain embodiments, the bridge is a single user interface element that is distinct from the underlying services and consistent across multiple services, content, applications, etc. Further, the bridge may include menu items and sub-menu items embedded within the menu items that can be utilized to navigate and/or select services and/or other content. In some embodiments, the bridge is implemented using a code module (e.g., a JavaScript library) that is separate and reusable for rendering web pages associated with the services.

By way of example, users, via user equipment (UEs) 101a-101n, may attempt to access content (e.g., a service) from, for instance, a content platform 103 over a communication network 105. In one embodiment, one or more services may be hosted on the content platform 103. A content database 107 can store content associated with and/or provided by the content platform 103. Further, the content platform 103 can utilize a bridge from a bridge platform 109 to provide access and navigation information for utilizing the services hosted on the content platform 103. In one embodiment, the bridge may be common to one or more of the services of the content platform 103. The bridge platform 109 may additionally have a bridge database 111 that includes information (e.g., service information, available languages, a mapping of available services to locations, etc.) that may be utilized to develop bridges for content platforms 103 and/or applications 113 (e.g., a web browser) on a UE 101. Further, in certain embodiments, the content database 107 and bridge database 111 may be included in the UE 101 and may be utilized to locally navigate services. For example, the operating system may provide a bridge to applications and/or other means to utilize services (e.g., web portals, widgets, etc.). When the location of the user changes, the operating system can determine the location change and modify the bridge to reflect available services to the user at the location.

In yet another embodiment, developers of content (e.g., web content, web services, media such as video, music, pictures, etc.) may design web sites and/or application programming interfaces (APIs) for use with the bridge platform 109. As such, the bridge may include an embeddable code module such as a JavaScript library that can be hosted on the bridge platform 109. For example, the code can be embedded in a web page associated with the content platform 103. Further, the bridge has the ability to determine the location of the user's UE 101 and customize the presentation of the bridge (e.g., navigation bar) based on services available to the user at the determined location. Approximate location can be determined by using the current cell identifier, the current internet protocol (IP) address, global positioning system (GPS), assisted-GPS (A-GPS) or other means. The location of the UE 101 can be determined, for instance, by the bridge platform 109 as further detailed FIG. 2 and in the processes of FIG. 4. Moreover, the bridge can present an interactive menu to enable the user to select and utilize services available to the user. To present the interactive menu, the bridge database 111 may include a list of services available in a particular location (e.g., a region such as a country, state, etc.). By way of example, the availability of services, content, etc. at a location can be affected licensing agreements, regulatory restrictions, and the like. In certain embodiments, the bridge can be utilized to block particular services based on the corresponding availability information. Further, the bridge platform 109 can include menu item information and services information in multiple languages. As such, the location of the UE 101 can be utilized to determine the language the menu item information is provided in.

Thus, the bridge is geo-aware and is able to determine services that are available in a certain location. Location can also be used to select the language (English, Spanish, Korean, etc.) used by the bridge. In this manner, the service provider can advantageously present a consistent and reusable bridge to users customized according to the respective locations of the users or users' UEs 101. Further, the service provider can provide a single code library to developers of content platforms 103 to embed the bridge within the web page of the developer, thereby advantageously reducing the need to manually update the code of each corresponding service to reflect any changes to the items available in the bridge. In this way, the bridge platform 109 can provide a means for creating and maintaining menus and geo-aware bridges for presentation on a UE 101. The bridge platform 109 can be implemented using various computing components such as components described in FIG. 2 and FIG. 8.

As noted above, the user of the UE 101 may navigate to a web page associated with a content platform 103. The web pages hosted on the content platform 103 may have the bridge embedded within them. The bridge platform 109 can determine the location of the user and select menu items associated with the services available at the location. The bridge platform 109 may additionally choose services available on one or more content platforms 103 and need not limit the menu items presented to the content platform 103. Further, in certain embodiments, the content platforms 103 may be related and include related services. For example, the services may be provided by the same service provider or associated service providers. Further, the content may be customized for particular users by creating a user account and sign-on for each user. In certain scenarios, the bridge database 111 includes user account and sign-on information. Further, the bridge database 111 can determine access of the user to premium services (e.g., based on account information, purchase information, subscription, etc.).

As previously noted, some services of the content platform 103 may be available in certain locations, but not in other locations. Thus, a UE 101 accessing the content platform 103 from the United States may have different services available and presented in the bridge than another UE 101 that accesses the content platform 103 from Canada. For example, due to licensing agreements, media services may have different content (e.g., audio and video files) available in Canada than in the United States. In another example, regulatory issues, such as restrictions in Indonesia or India that limit online file sharing services may limit accessibility of content. In certain embodiments, the menu items may look identical, but lead to different services. For example, a music service may be available in both Canada and the United States, however, in Canada, the user may be entitled to unlimited access to certain music, while in the United States, the user may be entitled to limited access. This access may be agreed upon by the service provider and copyright holders. When the user is presented the bridge and menu items on the web page, the user can provide input to the UE 101 to select one of the menu items in the bridge. As the user selects the menu item, additional menu items or sub-menu items may be presented to the user for selection. Some selected menu items may be utilized to cause initiation of one of the services corresponding to the menu item. Examples of services include media services such as music services (e.g., subscription music services, downloadable music services, streaming music services, etc.), video services (e.g., streaming video, downloadable video, etc.), picture services, or the like, news services, map services, social networking services, purchase related services (e.g., an online store), electronic mail services, calendar services, file management services, etc.

In certain embodiments, the UE 101 operating system and/or applications may be utilized to determine the location of the UE 101 and the available services. Further, instead of utilizing a web browser, the UE 101 may utilize an operating system or application bridge (e.g., a navigation bar) for presentation and navigation of menu items to the user. Moreover, the bridge can be persistent over screens of application or operating system information (e.g., different services may be presented on the screen while displaying the bridge).

As shown in FIG. 1, the system 100 comprises the user equipment 101 having connectivity to the content platform 103 and bridge platform 109 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user that allows an enumeration of a list of available services and selection from the list.

By way of example, the UE 101, bridge platform 109, and content platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
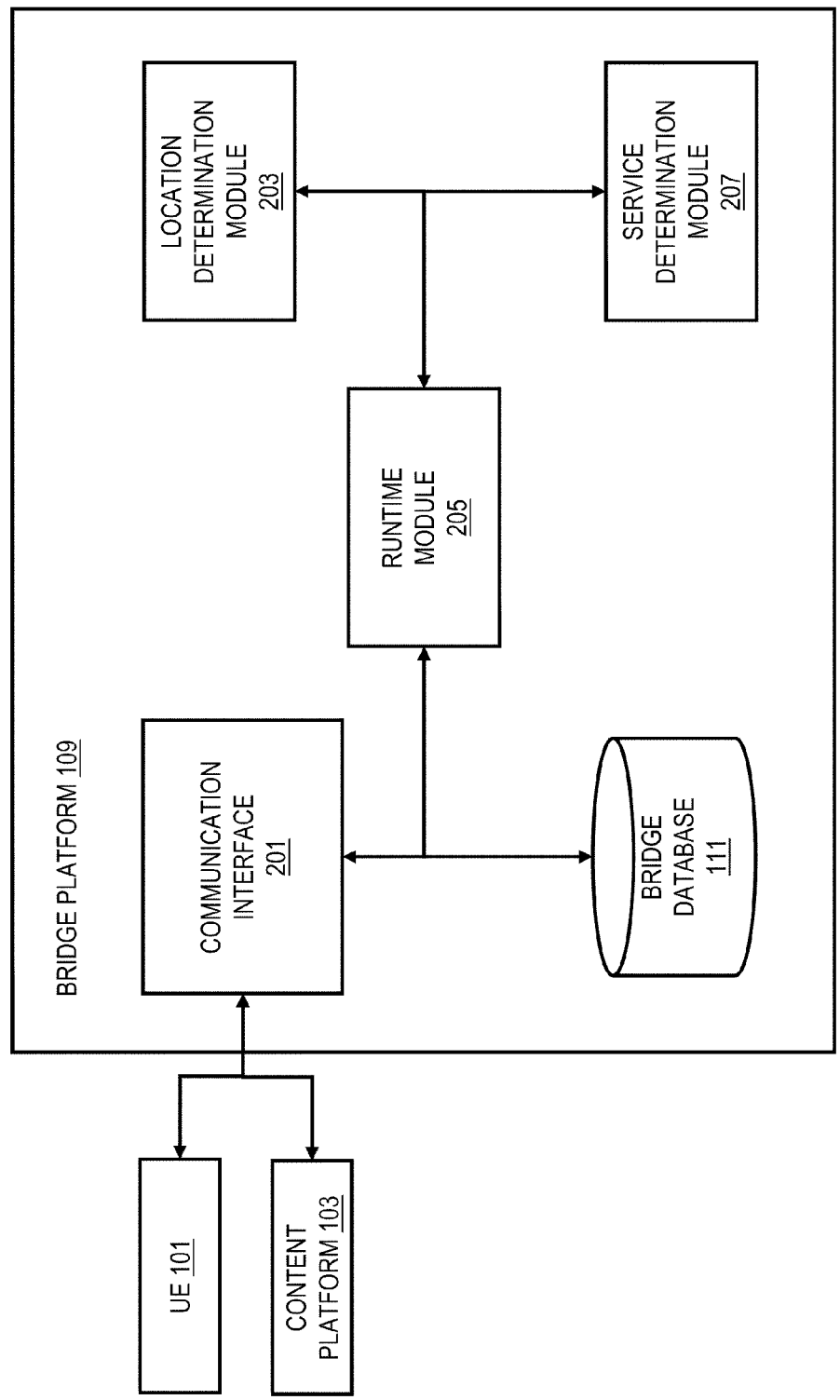
FIG. 2 is a diagram of the components of a bridge platform, according to one embodiment.

FIG. 2 is a diagram of the components of a bridge platform, according to one embodiment. By way of example, bridge platform 109 includes one or more components for providing a bridge for presentation of services available to a user. In one embodiment, the availability of the services is based, at least in part, on the location of the user accessing the services. It is contemplated that the functions of these components may be combined in one or more components or performed by other components of equivalent functionality. Additionally, the bridge platform 109 and its components may be considered a means for completing some or all of the steps in the processes of FIG. 4. Further, the bridge platform 109 may include a content platform 103 and/or the capabilities of a content platform 103. In this embodiment, the bridge platform 109 includes: a communication interface 201; a location determination module 203 that can determine the location of a device; a runtime module 205 that can execute processes; a service determination module 207 that can be used to determine which services are available to a user based, at least in part, on the user's location.

The communication interface 201 can be used to communicate with UEs 101, content platforms 103, or other devices associated with the communication network 105. The runtime module 205 can receive information from the UE 101 via the communication interface 201 via methods such as internet protocol, or other available communication method. In certain embodiments, the UE 101 requests a web page from a content platform 103 that utilizes a bridge from the bridge platform 109. The web page may have the bridge embedded (e.g., as a frame or element associated with the web page such as or a Hyper Text Markup Language (HTML) div element) within it. As such, the bridge may be one component of the web page, which may include other components, such as content (e.g., media such as images, video, audio, etc., text, services, etc.).

The runtime module 205 may utilize the location determination module 203 and service determination module 207 to determine the content to present via the bridge. The location determination module 203 may be utilized to determine the location of the UE 101 accessing the services associated with the bridge. In one embodiment, the location may be determined via a reverse lookup of an identifier (e.g., cell-ID, internet protocol address, etc.) of the UE 101, location sensor information (e.g., global positioning system coordinates), or a combination thereof. The reverse lookup function may be implemented by including a table of regions of locations as well as corresponding identifier information. For example, internet protocol addresses may be mapped to particular regions such as countries. It is contemplated that the location determination module 203 may use any other mechanism for determining the location or approximate location of the UE 101. Further, the location determination module 203 can utilize third party providers that provide location services to determine the location of the UE 101. Location service providers may have contact with the UE 101 and/or the bridge platform 109 to determine the location of the UE 101.

In one embodiment, the service determination module 207 can utilize the location of the UE 101 to determine the availability of a service or content to present at the UE 101. It is noted that different locations can have different information and/or available content (e.g., services) associated with each respective location. For example, a music service in France may have different available music content and/or licensing structures than a music service in Spain. Further, the music service may not be available in Spain altogether. In this case, the service may not be presented in the bridge at all, and there would be no indication of the service to the user. Thus, the service determination module 207 may determine what services are available to a UE 101 at a particular location. The bridge platform 109 maintains a data structure that may be utilized to correlate available services to locations. Further, the data structure may be individualized for different users/accounts and/or be generally applicable to all users/accounts.

Figure 3:
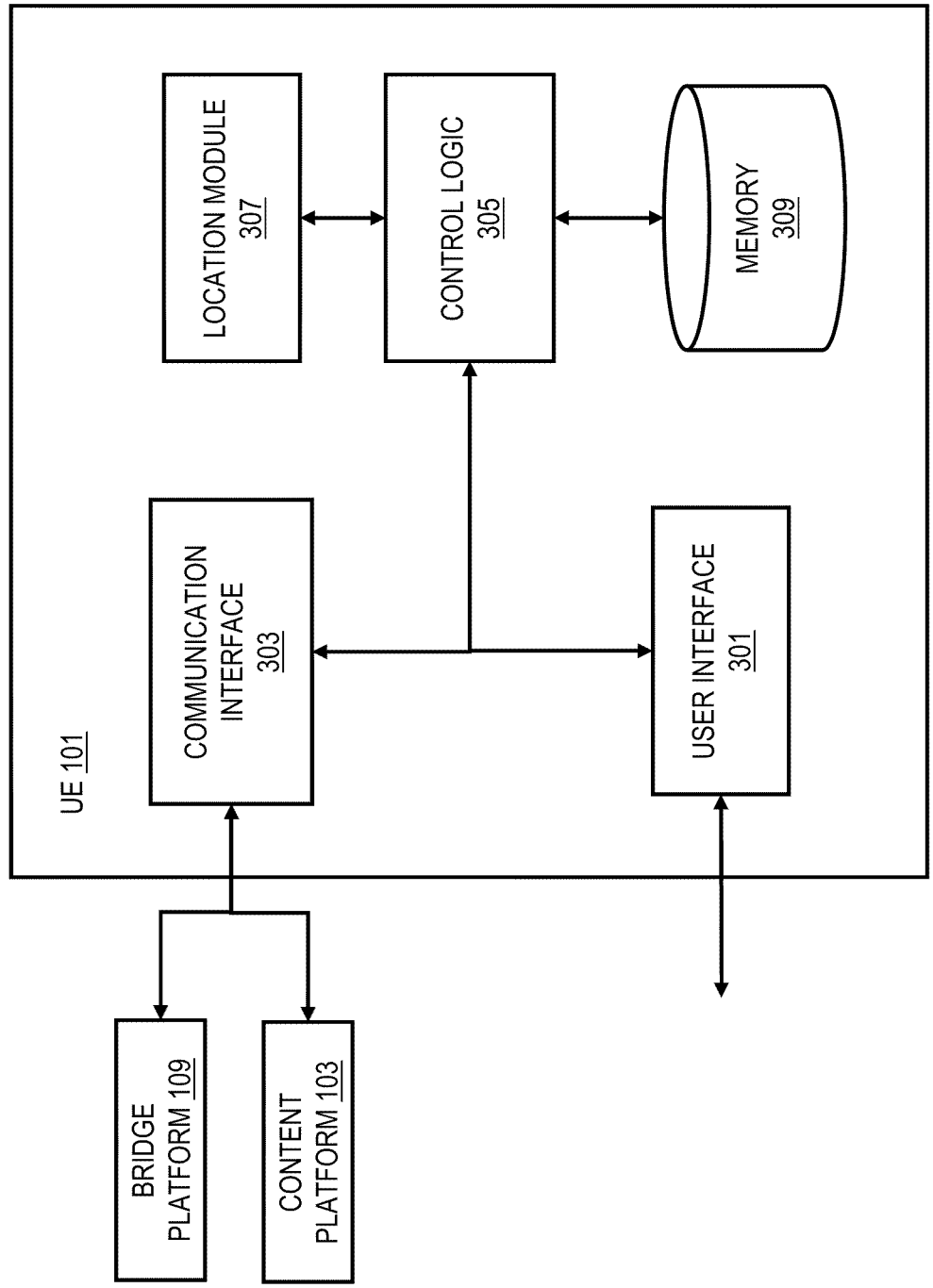
FIG. 3 is a diagram of the components of user equipment, according to one embodiment.

FIG. 3 is a diagram of the components of user equipment, according to one embodiment. It is contemplated that the functions of these components may be combined in one or more components or performed by other components of equivalent functionality. Additionally, the UE 101 and its components may be considered a means for completing some or all of the steps in the processes of FIG. 4. In this embodiment, the UE 101 includes user interface 301 to receive input and provide output at the UE 101, a communication interface 303 to communicate over a network, control logic 305 to control the execution of applications executing on the UE 101, and a location module 307 that may be utilized to determine the location of the UE 101.

The user interface 301 can include various methods of communication. For example, the user interface 301 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 301 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 301 may be utilized to present content and services made available by a content platform 103 and/or bridge platform 109. Further, the user interface 301 may be utilized to present menu items on a bridge to a user. The menu items may be selected by the control logic 305 and/or bridge platform 109 based on location information.

The location module 307 can determine a user's location. The user's location can be determined by a system such as a GPS, A-GPS, Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 307 may also utilize multiple technologies to detect the location of the UE 101. In certain embodiments, the location information is provided to the bridge platform 109 and/or content platform 103. The location information may be transmitted via the communication interface 303. Further, parts of the location information may be automatically embedded in communications originating from the UE 101. For example, the location information associated with the cell of origin and/or cellular networks may be embedded in communications (e.g., GPRS) over the communication network 105.

The communication interface 303 may include multiple means of communication. For example, the communication interface 303 may be able to communicate over SMS, MMS, internet protocol, instant messaging, voice sessions (e.g., via a phone network), or other types of communication protocols. The communication interface 303 can be used by the control logic 305 to communicate with other UEs 101, the content platform 103, the bridge platform 109, and other devices. In some examples, the communication interface 303 is used to transmit and receive communication messages to obtain services and/or content from the bridge platform 109 and/or content platform 103.

In certain embodiments, the browser 113 executes on the UE 101. As such, the control logic 305 can be a controller that controls the execution of the browser 113 on the UE 101. The user may utilize the user interface 301 to browse to a website stored on a content platform 103. The content platform 103 associated with the website may provide web pages with an embedded bridge from a bridge platform 109. In certain embodiments, the content platform 103 may include the bridge platform 109. The bridge may be dynamic based on the location of the UE 101 as well as based on the user and/or UE 101 privileges and/or account information. Account information may include services that the user has paid for and/or otherwise has access to (e.g., the service is free). The bridge is further detailed in the processes of FIG. 4.

Figure 4:
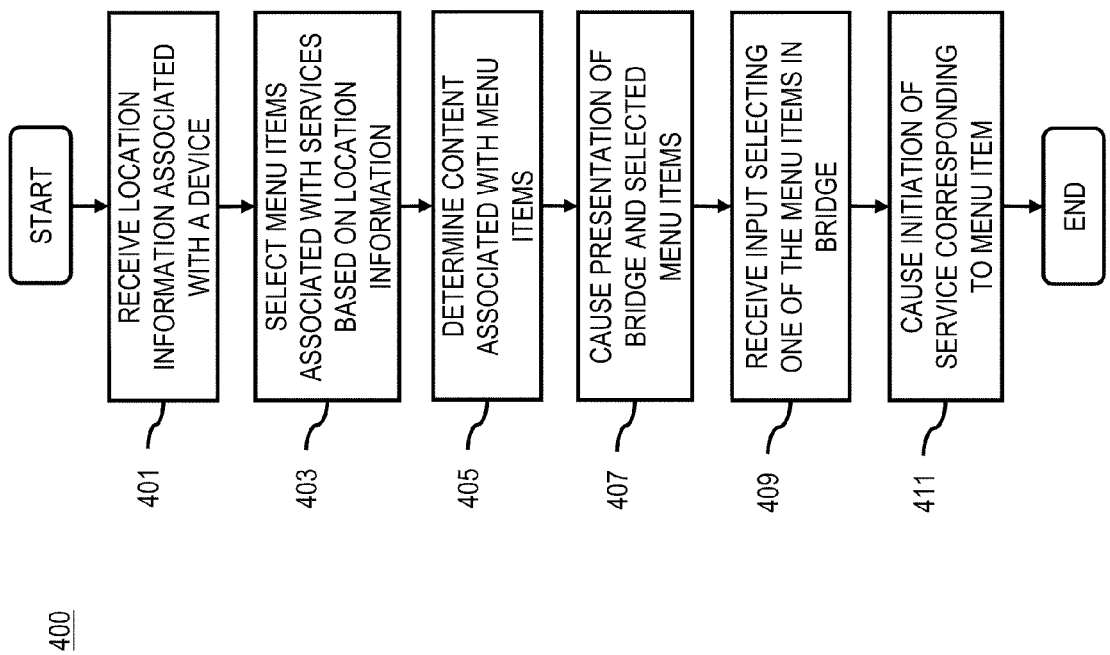
FIG. 4 is a flowchart of a process for presenting and utilizing a bridge based, at least in part, on the location of a device, according to one embodiment.

FIG. 4 is a flowchart of a process for presenting and utilizing a bridge based, at least in part, on the location of a device, according to one embodiment. In one embodiment, the runtime module 205 of the bridge platform 109 performs the process 400 and is implemented in, for instance, a chip set including a processor and a memory as shown FIG. 8. Further, the UE 101 and/or the content platform 103 may additionally be utilized to perform all of or a portion of the process 400. Moreover, the components of the bridge platform 109, content platform 103, UE 101, or a combination thereof may be means for performing the steps of the process 400. In one embodiment, the user may utilize a browser 113 on the UE 101 to navigate to a website associated with providing services. The website can, for instance, have web pages that embed a link to a bridge platform 109 that provides a bridge to display available services.

The bridge platform 109 receives a request for bridge content from the UE 101 or content platform 103 to provide to the UE 101. In step 401, the runtime module 205 receives location information associated with a UE 101 (e.g., a device, mobile device, personal computer, etc.). In certain embodiments, information is received as part of the request. As such, location information may be any information that may be utilized to determine the location of the UE 101. The runtime module 205 can use the location determination module 203 to transform the location information into transformed location information that associates the UE 101 with a particular location or area. For example, the location determination module 203 may take location information, such as GPS coordinates, cell-ID or IP address, and determine a country, state, city, region etc. associated with the UE 101. Further, the location information can be received from a third party provider, such as a Content Delivery Network (CDN) provider, which may be utilized to provide a location service.

Then, the runtime module 205 selects menu items associated with services based, at least in part, on location information (step 403). As noted above, the menu items can be associated with an area or region where a particular service is available (e.g., unblocked). The service determination module 207 can determine the services and content available to the user by using the bridge database 111. The bridge database 111 may include data structures (e.g., a list, table, etc.) that can be utilized to map services and service content available to certain regions and/or to the user in the regions. Moreover, the regions can be associated with location information (e.g., mapped to location coordinates). As such, a region can be determined based on the location information. Reasons for having access to services in one region, but not another region include: the service being illegal and/or regulated in a particular location, copyright and/or licensing issues related to the service in particular regions (e.g., the service provider is able to obtain a license for providing content in one region, but not another), business policy (e.g., the service may not be translated into the major language of the region. In one example, the user may have access to a particular service (e.g., music) in a particular region (e.g., the United States), but may have an altered version of the service or no service available in another region (e.g., Canada). In this example, Canadian regulations may prohibit the use of the Music Service. The service provider may have a subscription based license to stream particular music over the web in the United States, however, the available music content may be modified, different, or unavailable in Canada according to rights of the service provider. As such, the runtime module 205 determines content associated with the menu items (step 405). The content may additionally be associated with one or more languages associated with the region of the UE 101. For example, the runtime module 205 can determine that the user's location is associated with a particular language. Thus, the menu items and services may be provided in a particular language tied to the location. In certain embodiments, the location is static (e.g., if the location is based on a user's country of registration), in other embodiments, the location can be dynamic based on movements of the UE 101 (e.g., if the location is based on GPS coordinates, network identifiers (e.g., internet protocol address, a Mobile Network Code (MNC), etc.), network locations (e.g., cell identifiers, wireless network identifiers), etc.). Further, in certain embodiments, the location information may include an override location that allows the user to select the current location of the user and/or language. The menu items can be visual indicators of the available services for the user based, at least in part, on the location of the user's UE 101.

Further, the runtime module 205 can cause, at least in part, presentation of the selected menu items in a bridge (step 407). The runtime module 205 can cause the presentation by providing content information to the UE 101 for presentation, by pre-rendering the content information and providing that information for presentation, or the like. The bridge may be a user interface element common to multiple services (e.g., the services available on one or more content platforms 103). In certain embodiments, the user interface element is a single element (e.g., a single navigation bar) that is comprised of selected menu items that can be determined based on location. The navigation bar may be a separate component from the rest of the web page. Further, as noted above, the information from the navigation bar may be sent to the UE 101 from a bridge platform 109 that is different from the content platform 103. As noted above, the presentation of the selected menu items is based, at least in part, on the location of the UE 101. As such, the presentation of the selected menu items may be presented in a determined language associated with the location.

The runtime module 205 receives input selecting one of the menu items in the bridge (step 409). The received input may be utilized to present additional selected menu items (e.g., as an interactive menu). Further, the received input can be utilized to cause, at least in part, initiation of one of the available services corresponding to the menu item (step 411). Such services may be provided by the content platform 103 or another content platform 103. Because the bridge can link to services from various content platforms 103, the services need not be interconnected or even know of the presence of other services.

In certain embodiments, the UE 101 operating system and/or application(s) perform the steps of the process 400. In these embodiments, the received location information is determined at the UE 101 and the menu items associated with the services based on the location information are performed by the control logic 305 of the UE 101. Additionally or alternatively, the determined content associated with the menu items may be determined by the control logic 305. The control logic 305 may receive bridge information (e.g., lists, tables, etc.) associated with the bridge from the bridge platform 109 and store the bridge information in memory 309. The bridge information may include menu items associated with services as well as translations of the menu items. The control logic 305 may receive updates of the bridge information from the bridge platform 109 or receive updates when installing applications onto the UE 101. Further, the services may be stored in the memory of the UE 101 along with a data structure mapping languages and/or available services for locations. In this manner, available services may be presented to the user of the UE 101 based on location. Further, in some embodiments, the menu structure may show all of the installed services on the UE 101 during presentation of the menu items on the bridge, but ghost unavailable menu items and services. In this embodiment, ghosting is presenting a menu item to show that the menu item is associated with the UE 101 (e.g., installed), but unavailable (e.g., non-selectable). Thus, control logic 305 can determine that a service is unavailable to the user of the UE 101 based on the location of the UE 101 and block unavailable services. As noted above, a service may be unavailable due to different licensing of content in different countries or regions (e.g., media in France may have different copyright licenses than media in Spain, thus there may not be adequate rights for the user to utilize the service in the current country the user is located at).

Figure 5:
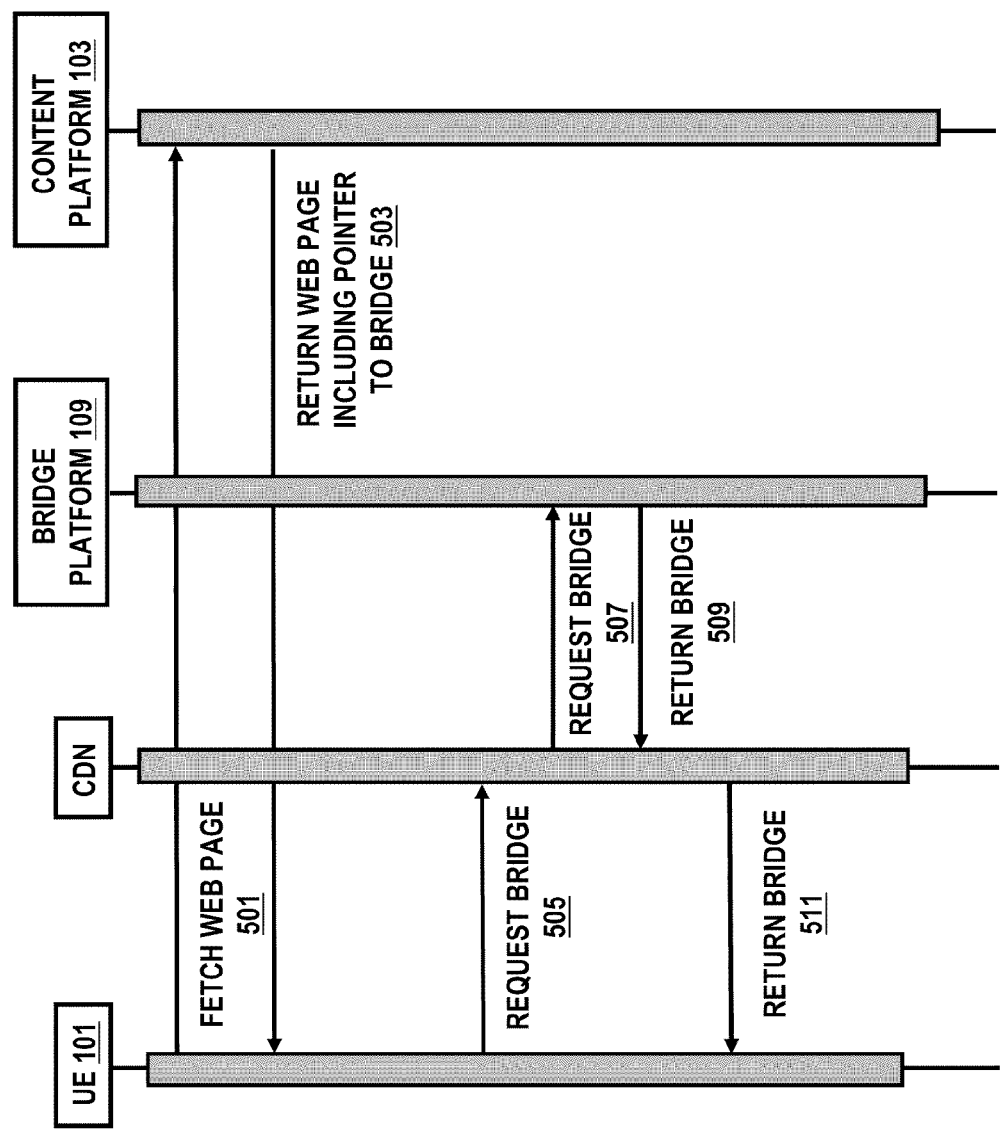
FIG. 5 is a ladder diagram of a process for presenting and utilizing a bridge, according to one embodiment.

FIG. 5 is a ladder diagram of a process for presenting and utilizing a bridge, according to one embodiment. A network process on the network is represented by a shaded vertical box. A message passed from one process to another is represented by horizontal arrows. A step performed by a process is indicated by the text. The processes represented in FIG. 5 can be utilized to present and utilize the bridge.

A browser 113 executing on control logic 305 of the UE 101 can be utilized to navigate to a web page. The web page can be stored on a content platform 103 (e.g., a web server) and may include one or more services as well as content provided by those services. At step 501, UE 101 fetches the web page from the content platform 103 by requesting the web page from the content platform 103. The content platform 103 receives the request and returns a web page including one or more pointers to a bridge (step 503). The bridge can be stored and be accessible on the bridge platform 109. Further, the bridge, or information associated with the bridge, may be available on a CDN. A CDN is a system of computers that contains copies of information available from the content platform 103. The computers may be placed at various places in a network to distribute network traffic load and/or maximize access bandwidth to retrieve the information. A CDN allows the UE 101 to access a copy of the bridge without contacting the bridge platform 109.

The CDN may receive the request for the bridge from the UE 101 (step 505). Then, the CDN can request the bridge from the bridge platform 109 (step 507). The bridge platform 109 then determines the bridge associated with the UE 101 (e.g., based on location information) and causes, at least in part, transmission of bridge information to the CDN that made the request (step 509). Then, the CDN initiates transmission of the received bridge information to the UE 101 (step 511). The UE 101 thus has the information to present the bridge information to the user. Further, in certain embodiments, instead of requesting and receiving the bridge information (steps 507, 509) from the bridge platform 109, the CDN can store copies of the bridge information associated with different locations. For example, a CDN may store copies of menu items for services available in France. Further, the CDN may additionally include translations for the menu items and services based on the location. Further, the CDN or other may provide a location service for the bridge platform 109 by determining the location of the UE 101 based on the location of the CDN delivering content to the UE 101.

FIGS. 6A-6D are diagrams of user interfaces utilized in the processes of FIG. 4, according to various embodiments. The user may utilize the user interface 600 of FIG. 6A to navigate to a web page. The web page may include a link (e.g., a Uniform Resource Identifier (URI), a Uniform Resource Locator (URL), pointer, etc.) to a bridge 601 that can be displayed. Further, the bridge 601 may be a single div or a JavaScript object presented as a single user interface element (e.g., the bar) on a section of the user interface display. As noted above, the bridge 601 can be presented as a navigation bar in the web page. Moreover, the bridge 601 can include menu items (e.g., visual representations such as icons). The menu items may be utilized to create an interactive menu. Further, as noted above, the interactive menu can include services. The services may be associated with the current web page or other web pages. The services can be presented in another section 603 of the user interface display. This other section 603 can be different or distinct from the web page section representing the bridge 601. For example, in the case of a media service selected from the bridge 601, media can be presented in the other section 603. In certain embodiments, the user is provided an override function 605 to override the location and/or language associated with the bridge 601. As the user selects menu items from the interactive menu, the user is presented with menus leading to services (e.g., via links) that are available to the user based, at least in part, on the location of the user. The links to services may be presented in the web browser. The presentation takes place in a separate section or sections of the browser from the bridge 601.

Figure 6A:
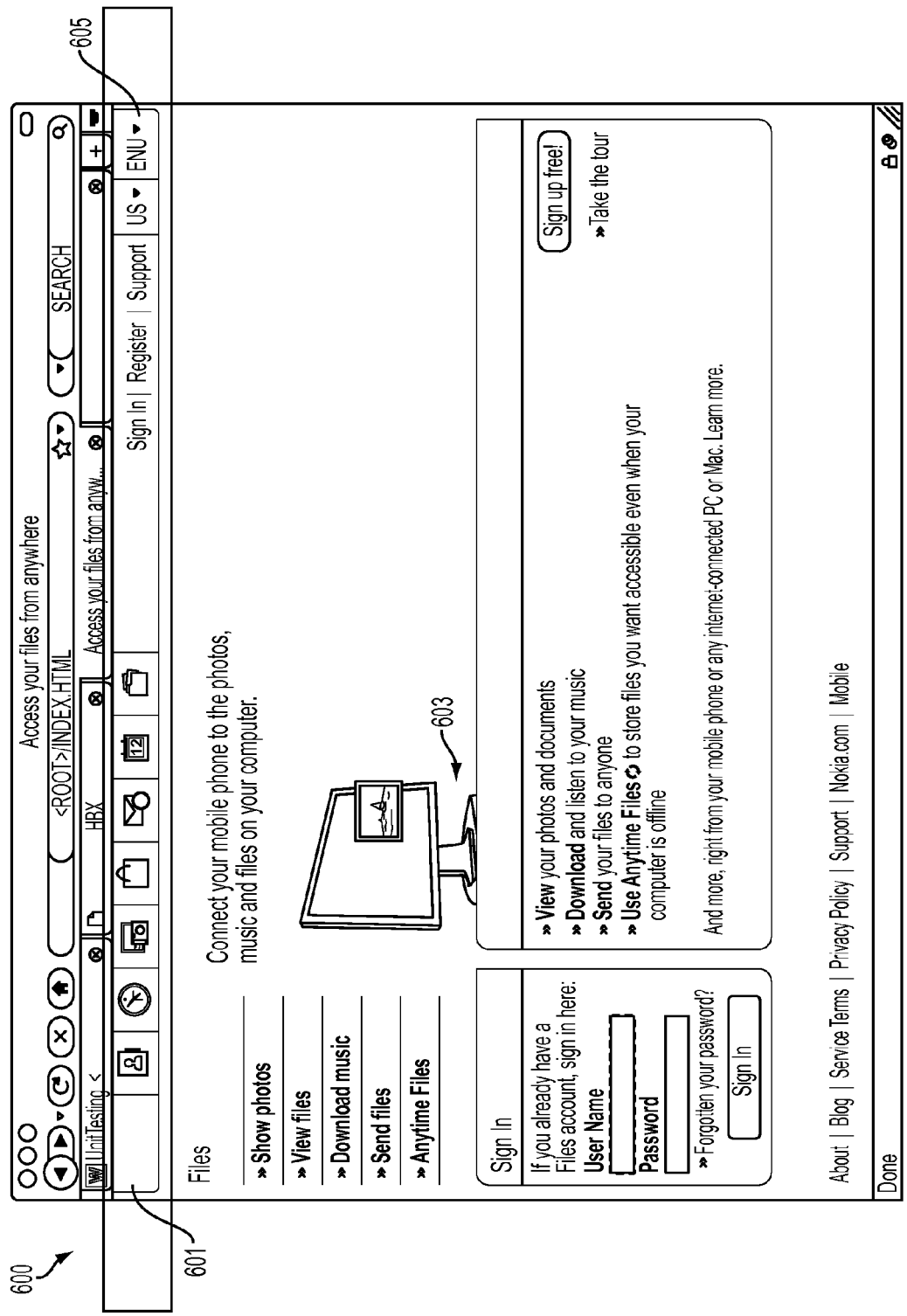
FIGS. 6A-6D are diagrams of user interfaces utilized in the processes of FIG. 4, according to various embodiments.
Figure 6B:
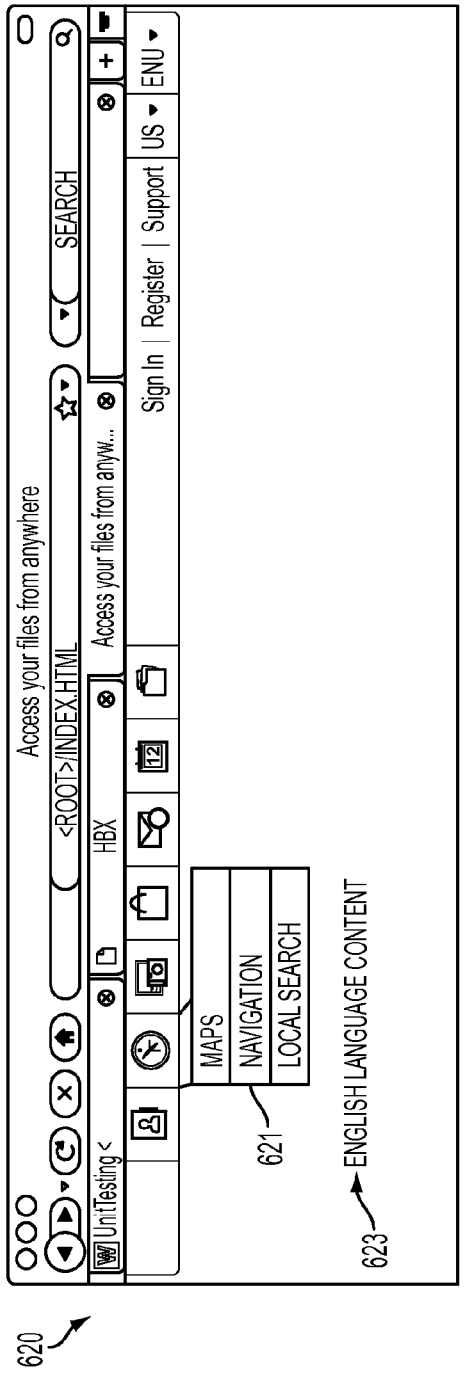

As shown in FIG. 6B the user interface 620 can be utilized to present an interactive menu 621. With user interface 620, the bridge reflects that the user is in the United States, which uses English as the default language for the bridge. The interactive menu 621 reflects the services available by only presenting services available in the respective areas. For example, a submenu of user interface 620 is associated with maps, navigation, and local search services or content. As shown, the submenu items may be represented as graphical icons, text menu items, or both. It is contemplated that the services may be depicted or represented using any type of user interface element. Further, the services selected can be presented in a separate section 623 of the web browser in the language associated with the location.

Figure 6C:
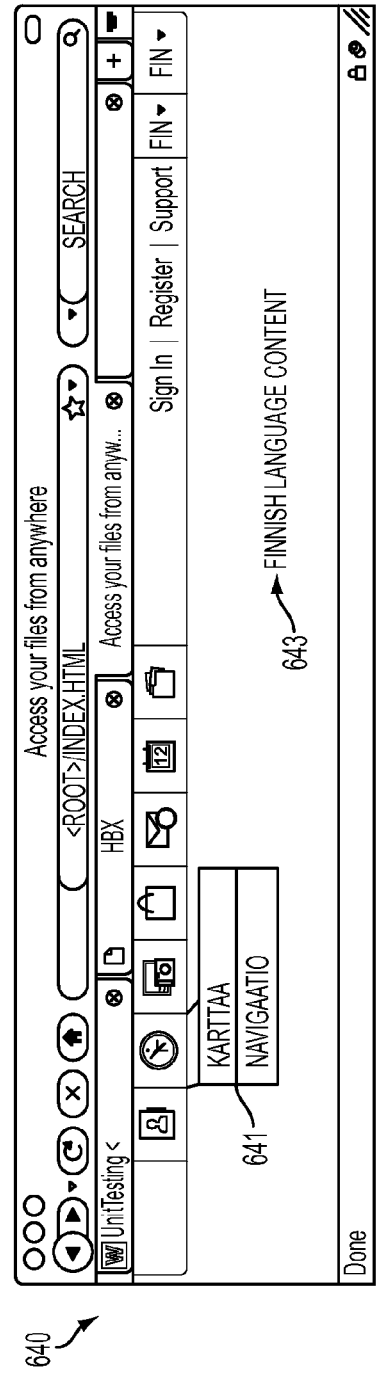

FIG. 6C depicts a user interface 640 that is similar to the user interface 620 of FIG. 6B. As shown in FIG. 6C, the user interface 640 presents an interactive menu 641 of a bridge that reflects that the user is in Finland and uses the Finnish language. The interactive menu 641 reflects this by only presenting services available in Finland. The bridge detects that the UE 101 of user interface 640 is in Finland, where the local search service displayed in FIG. 6B is unavailable and is not shown in the interactive menu 641. Further, the interactive menu 641 is presented in the language associated with the location of the user (Finnish). Selected services can be presented in a separate section 643 of the web browser in the language associated with the location.

Figure 6D:
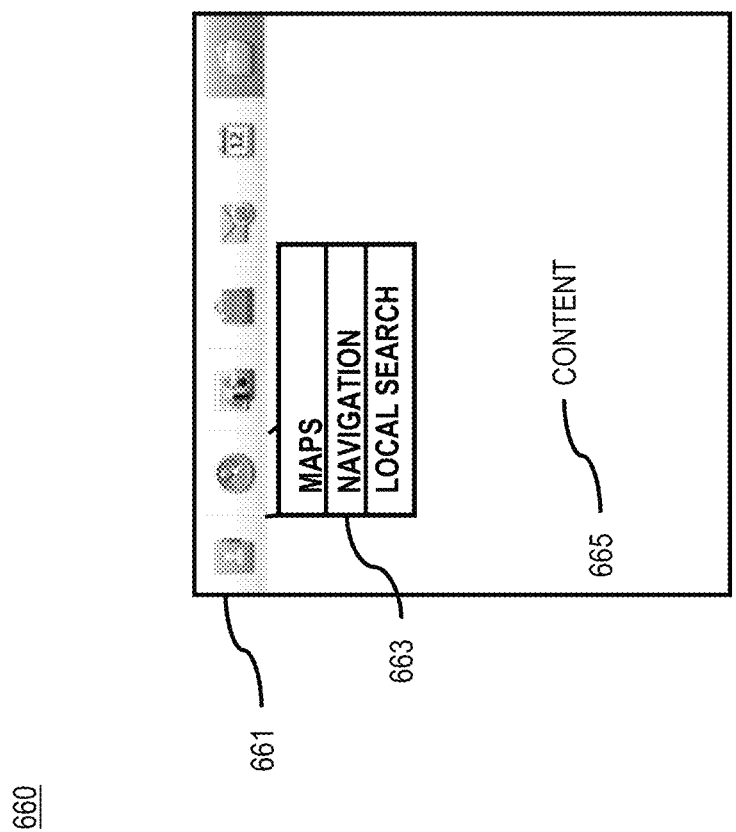

The user interface 660 of FIG. 6D shows a local bridge 661 associated with a local operating system of a UE 101. As such, the local bridge 661 is an operating system element. The bridge 661 can have an associated interactive submenu 663. As such, the bridge 661 is utilized to link or otherwise lead to an application that uses a service. The service may be provided or partially provided via a communication network 105 by a content platform 103. As with the services provided via a web page, the content 665 (e.g., map content, e-mail content, photo content, game content, etc.) associated with the service(s) selected via the interactive menu is presented in another portion of the display separate from the bridge 661.

With the above approaches, a service provider is able to present available services to a user utilizing a bridge. As such, the service provider can provide available services based on the location of the user. The detection of the location of the user provides for increased efficiency of the user and the UE 101 of the user. In certain embodiments, because only available services are presented to the user, the user need not navigate through menu items that are not available to the user. Further, the use of a CDN helps alleviate bandwidth pressures on the bridge platform 109 by removing certain overhead. Additionally, the bridge platform 109 allows the user to navigate to services residing on more than one content platform 103 (e.g., content server).

The processes described herein, including for providing user interface navigation information associated with the availability of services, may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
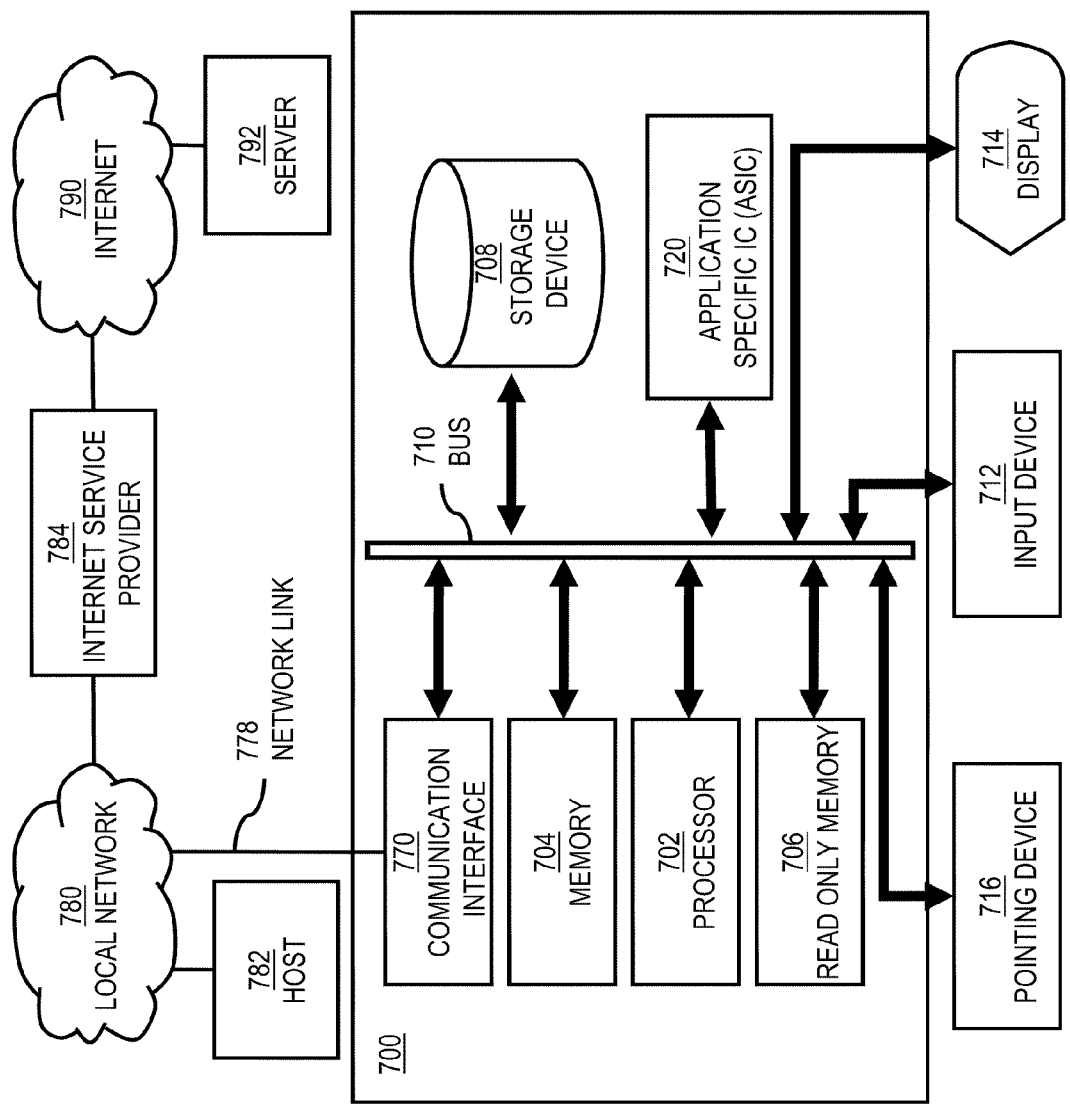
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide user interface navigation information associated with the availability of services as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing user interface navigation information associated with the availability of services.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing user interface navigation information associated with the availability of services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing user interface navigation information associated with the availability of services. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing user interface navigation information associated with the availability of services, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing communications to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
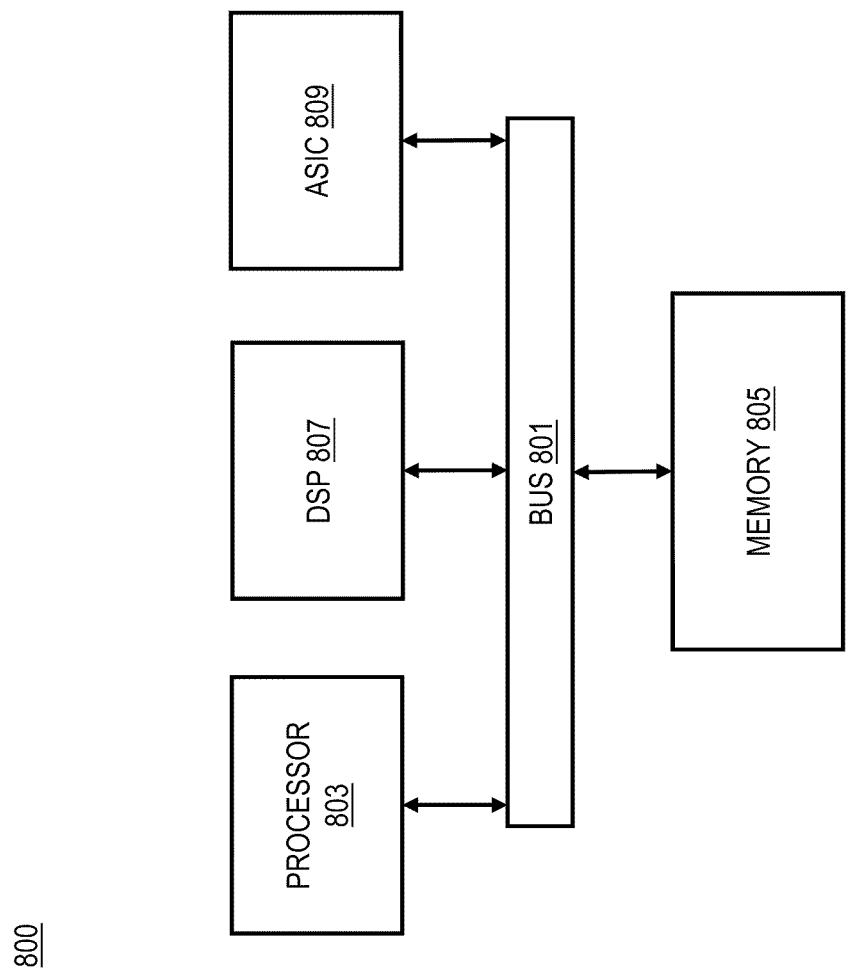
FIG. 8 is a diagram of a chip set that can be used to implement an embodiment of the invention.

FIG. 8 illustrates a chip set or chip 800 upon which an embodiment of the invention may be implemented. Chip set 800 is programmed to provide user interface navigation information associated with the availability of services as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide user interface navigation information associated with the availability of services. The memory 805 also stores the data associated with or generated by the execution of the inventive steps.

Figure 9:
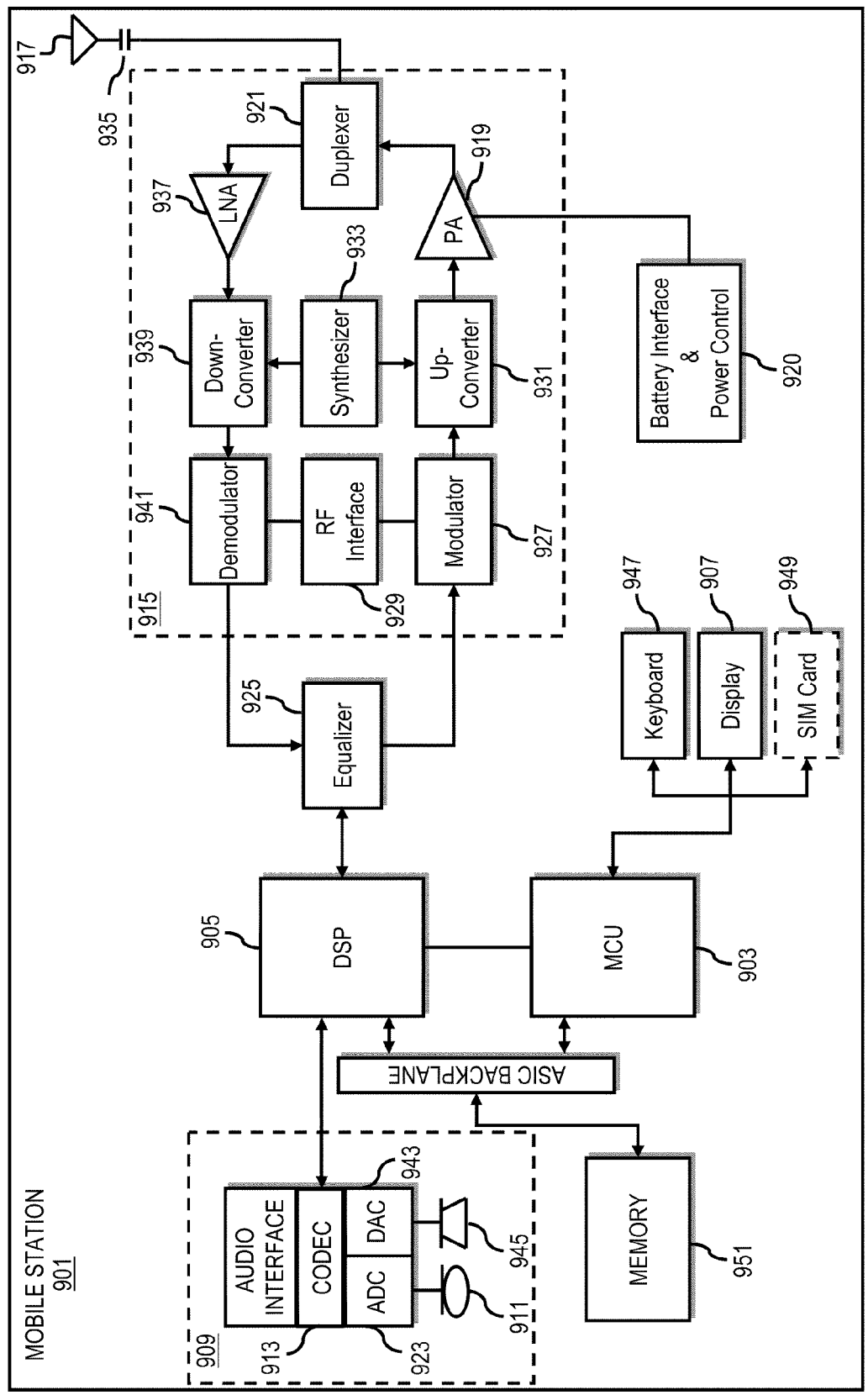
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing user interface navigation information associated with the availability of services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing user interface navigation information associated with the availability of services. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide user interface navigation information associated with the availability of services. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving location information associated with a device;
   selecting, via a processor, menu items associated with two or more different services based on the location information;
   causing, at least in part, presentation, via the processor, of the selected menu items in a bridge, wherein the bridge is a user interface element common to the two or more different services; and
   determining a language based on the location information, wherein the selected menu items are presented in the determined language,
   wherein the menu items are associated with the two or more different services that are available to the device based on the location information, and
   wherein at least one menu item associated with the two or more different services is presented in a manner indicating that the at least one menu item is unavailable to the device at the location indicated by the location information associated with the device.

2. A method of claim 1, further comprising:
   determining whether the services are illegal, regulated, restricted, or a combination thereof with respect to the location information,
   wherein the selection of the menu items is based, at least in part, on the determination.

3. A method of claim 1, further comprising:
   determining copyright issues, licensing issues, or a combination thereof with respect to the services and the location information,
   wherein the selection of the menu items is based, at least in part, on the copyright issues, licensing issues, or combination thereof.

4. A method of claim 1, further comprising:
   determining a policy associated with the services, the location information, or a combination thereof,
   wherein the selection of the menu items is based, at least in part, on the policy.

5. A method of claim 1, wherein the location information is obtained by a reverse lookup of an identifier of the device, a location sensor, a network location, a location service, or a combination thereof.

6. A method of claim 1, wherein the services or provided over one or more content delivery networks.

7. A method of claim 1, wherein the bridge is presented as a navigation bar in a web page associated with at least one of the services.

8. A method of claim 1, wherein the bridge is a code module that is separate and reusable for rendering web pages associated with the services.

9. A method of claim 1, wherein the bridge is an operating system element linking to at least one application associated with at least one of the services.

10. An apparatus comprising:
at least one processor; and
at least one memory including computer program code,
the at least one memory and the computer program code configured to, with the at least one processor, cause the apparatus to perform at least the following,
receive location information associated with a device;
select menu items associated with two or more different services based on the location information;
cause, at least in part, presentation of the selected menu items in a bridge, wherein the bridge is a user interface element common to the two or more different services; and
determine a language based on the location information,
wherein the selected menu items are presented in the determined language,
wherein the menu items are associated with the two or more different services available to the device based on the location information, and
wherein at least one menu item associated with the two or more different services is presented in a manner indicating that the at least one menu item is unavailable to the device at the location indicated by the location information associated with the device.

11. An apparatus of claim 10, wherein the apparatus is further caused, at least in part, to:
determine whether the services are illegal, regulated, restricted, or a combination thereof with respect to the location information,
wherein the selection of the menu items is based, at least in part, on the determination.

12. An apparatus of claim 10, wherein the apparatus is further caused, at least in part, to:
determine copyright issues, licensing issues, or a combination thereof with respect to the services and the location information,
wherein the selection of the menu items is based, at least in part, on the copyright issues, licensing issues, or combination thereof.

13. An apparatus of claim 10, wherein the apparatus is further caused, at least in part, to:
determine a policy associated with the services, the location information, or a combination thereof,
wherein the selection of the menu items is based, at least in part, on the policy.

14. An apparatus of claim 10, wherein the location information is obtained by a reverse lookup of an identifier of the device, a location sensor, a network location, or a combination thereof.

15. An apparatus of claim 10, wherein the services or provided over one or more content delivery networks.

16. An apparatus of claim 10, wherein the bridge is presented as a navigation bar in a web page associated with at least one of the services.

17. An apparatus of claim 10, wherein the bridge is a code module that is separate and reusable for rendering web pages associated with the services.

18. An apparatus of claim 10, wherein the bridge is an operating system element linking to at least one application associated with at least one of the services.

* * * * *